United States Patent
Kjellgren

[15] 3,656,685
[45] Apr. 18, 1972

[54] CENTRIFUGE

[72] Inventor: Ove Allan Valentin Kjellgren, Stockholm, Sweden

[73] Assignee: Alfa-Laval AB, Tumba, Sweden

[22] Filed: Jan. 8, 1969

[21] Appl. No.: 789,865

[30] Foreign Application Priority Data

Jan. 9, 1968 Sweden.....................................232/68

[52] U.S. Cl..................................................233/19
[51] Int. Cl...............................................B04b 11/00
[58] Field of Search.................233/19, 20, 21, 22, 16, 17, 233/18, 28, 38, 46

[56] References Cited

UNITED STATES PATENTS 3,052,401  9/1962  Thylefors.................................233/21
3,437,267  4/1969  Dahlberg.................................233/21

Primary Examiner—Robert W. Jenkins
Attorney—Davis, Hoxie, Faithfull & Hapgood

[57] ABSTRACT

A centrifugal rotor is provided with an inlet for a mixture of two liquid components to be separated from each other and of which one component is high viscous, the rotor also having outlets for the respective separated components. A displacement pump is inserted in the discharge pipeline of a paring means which forms the outlet for the highly viscous component, and the throughput capacity of this pump is adjustable during operation to control the discharge of the two separated components from the rotor.

3 Claims, 1 Drawing Figure

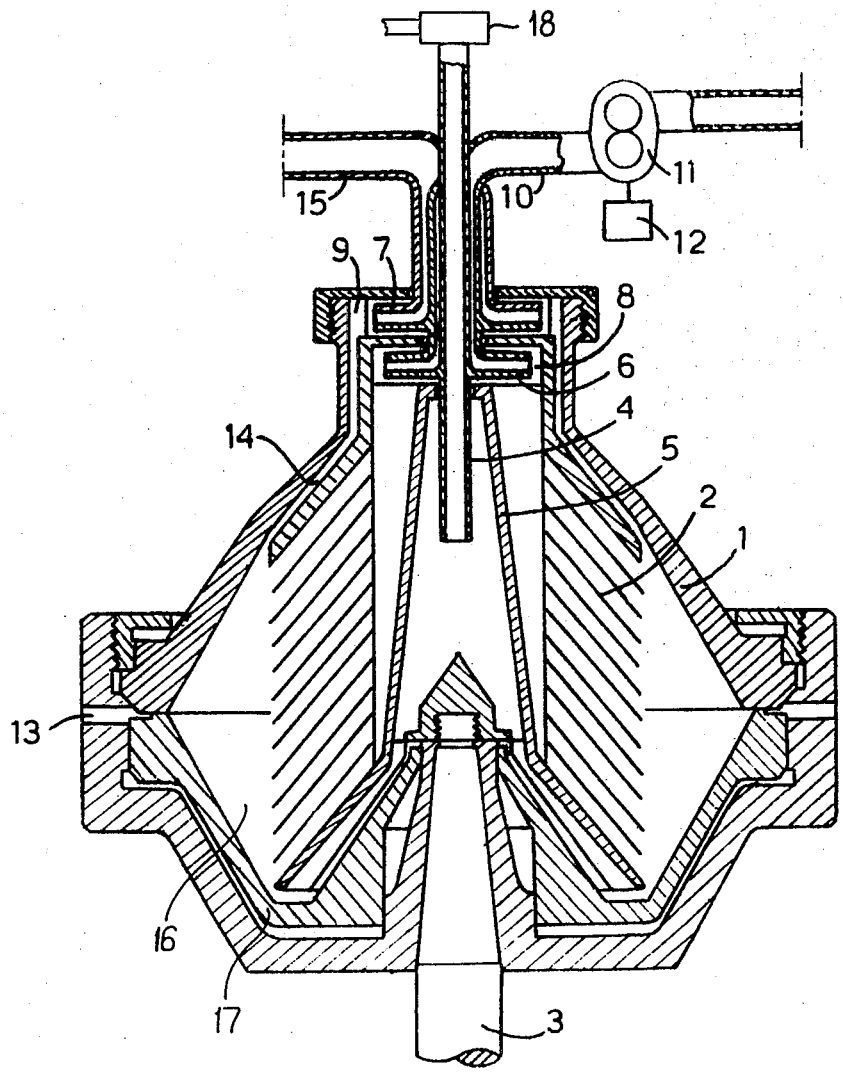

CENTRIFUGE

The present invention relates to centrifuges for separating from each other two liquid components of which one is highly viscous.

To effect such a separation, it has been proposed to provide a stationary pipeline hermetically connected to the centrifuge outlet for the highly viscous component, and to insert in this pipeline a displacement pump which is adjustable as to its throughput capacity during operation. A prior centrifuge so constructed is disclosed in Swedish Pat. No. 219,547 and also in U.S. application Ser. No. 624,480 filed Mar. 20, 1967, now U.S. Pat. No. 3,437,267, in the name of Bengt I. Dahlberg.

In separating cream from milk, it is an objective to effect the separation in a manner whereby the fat content of the cream discharging from the centrifuge will remain constant. For this purpose, it would be possible to use the above-mentioned prior centrifuge. However, such use presents the difficulty that whereas modern dairies seek to operate with minimum supervision by their personnel, centrifuges with hermetically sealed inlets and outlets require considerable supervision due to the risk of leakage at the seals for the inlets and outlets.

Attempts have been made to use centrifuges with paring disc outlets when separating cream from milk. These attempts, however, have not provided satisfactory results in cases where thick cream is to be obtained and especially when separating cold milk (normally at 4° C.), since the cream will have high viscosity even at moderate fat contents. In this case, the fat content varies appreciably due to pressure oscillations which occur in the outlet pipeline for the cream.

I have discovered that the foregoing difficulties can be avoided if a centrifuge according to the above-mentioned Swedish patent is modified by providing a paring means constituting the centrifuge outlet for the highly viscous component and inserting in the outlet pipe of the paring means a displacement pump which is adjustable as to its throughput capacity during operation.

With the new centrifuge, it is possible when separating cold milk, such as milk at 4° C., to obtain a cream having a constant fat content within the range of about 40–45 percent of fat. The same is true when separating warm milk for the production of cream having a higher fat content than 55 percent, in which case milk at about 50° C. is separated. The desired fat content of the cream is kept constant by a corresponding control of the number of revolutions of the displacement pump. Of course, the invention is not limited to the separation of milk but can also be used when separating other liquid mixtures containing a component of high viscosity.

Due to the fact that one of the components, preferably that of high viscosity, is discharged by means of a paring device and a displacement pump, the other component can also be discharged, without undue influence on the pressure balance in the centrifuge rotor, by means of a paring device, which in that case serves as a pump for the discharged component.

Finally, in order to insure steady control conditions in the displacement pump, it is desirable to use conventional means by which a constant quantity per unit of time of the liquid mixture to be separated is supplied to the centrifuge.

The invention is described more in detail below, reference being made to the accompanying drawing in which the single illustration is a vertical sectional view of a centrifuge embodying an example of the invention. While the centrifuge as illustrated is of the self-opening type, it will be understood that the invention is not limited thereto but may be embodied, for example, in a nozzle centrifuge or a centrifuge having a solid rotor wall.

In the drawing, a centrifugal rotor 1 contains a conical disc set 2 and is driven by a spindle 3. A stationary inlet pipe 4, which opens into a distributor 5, carries two stationary paring discs 6 and 7. These discs are located in respective paring chambers 8 and 9. The paring disc 6 discharges light component through a stationary pipeline 10, in which there is inserted a gear pump 11 or other displacement pump, and the rotational speed of the pump motor is adjustable during operation by conventional means shown schematically at 12. Sludge collected in the sludge space 16 of the centrifuge is discharged periodically through openings 13 by a slide valve 17 conventionally operated. Heavy component is led through channels 14 to the paring chamber 9 and discharges through a pipeline 15 leading from the paring disc 7.

It is assumed in the illustrated example that whole milk is separated. Separated cream travels inwardly through the disc set 2 and reaches the paring chamber 8, from which it is discharged by means of the paring disc 6. The quantity of cream discharged per unit of time is determined by the pump 11. The rest of the supplied milk discharges as a skim milk through the pipeline 15. The periodical discharges of sludge through the openings 13 have no practical influence on the constancy of the fat content of the separated cream, since the sludge discharges take place within about 1 second, whereas the time interval between the discharges can be several hours.

Shown schematically at 18 is a conventional means for supplying the feed mixture at a constant rate (quantity per unit of time) to the centrifuge inlet by way of pipe 4.

I claim:

1. A centrifuge for separating from each other two liquid components of which one component is highly viscous, the centrifuge comprising a hollow centrifugal rotor having an inlet for a mixture of said components, paring means forming an outlet for said one component separated in the rotor, the rotor having a second outlet for the other component, an outlet pipeline leading from said paring means, a displacement pump inserted in said pipeline, and means for adjusting the throughput capacity of said pump during operation thereof.

2. A centrifuge according to claim 1, comprising also a second paring means forming said second outlet.

3. A centrifuge according to claim 1, comprising also means for supplying a mixture of said components to said inlet at a constant rate.

* * * * *